United States Patent [19]
Fullhart et al.

[11] Patent Number: 5,190,195
[45] Date of Patent: Mar. 2, 1993

[54] HITCH MOUNTED BICYCLE RACK

[75] Inventors: Richard L. Fullhart, Goshen; Steven L. Garatoni, Osceola; David J. Troyer, Elkhart, all of Ind.; Philip K. Hoopes, Jr., Union, Mich.

[73] Assignee: Reese Products, Elkhart, Ind.

[21] Appl. No.: 670,314

[22] Filed: Mar. 15, 1991

[51] Int. Cl.⁵ .................................................. B60R 9/00
[52] U.S. Cl. ....................... 224/42.03 B; 224/42.45 R; 224/42.44; 224/42.01
[58] Field of Search .............. 224/42.03 B, 324, 42.01, 224/42.45 R, 42.07, 42.44; 211/17, 18, 22

[56] References Cited

U.S. PATENT DOCUMENTS

| | | |
|---|---|---|
| 585,458 | 6/1897 | Bailey . |
| 640,736 | 1/1900 | Biester . |
| 2,803,349 | 8/1957 | Talbot . |
| 3,225,986 | 12/1965 | Anderson . |
| 3,240,406 | 3/1966 | Logan . |
| 3,794,227 | 2/1974 | Stearns . |
| 3,796,333 | 3/1974 | Goldstein . |
| 3,853,255 | 12/1974 | Spencer . |
| 3,858,775 | 1/1975 | Haas . |
| 3,876,123 | 4/1975 | Stuntz . |
| 3,877,622 | 4/1975 | McLain . |
| 3,923,220 | 12/1975 | Marcyan . |
| 4,050,616 | 9/1977 | Mosow . |
| 4,089,448 | 5/1978 | Traeger ................... 224/42.03 B |
| 4,290,540 | 9/1981 | Allen . |
| 4,296,879 | 10/1981 | Jordening . |
| 4,299,341 | 11/1981 | Copeland . |
| 4,301,953 | 11/1981 | Abbott . |
| 4,318,501 | 3/1982 | Graber . |
| 4,332,337 | 6/1982 | Kosecoff . |
| 4,336,897 | 6/1982 | Luck . |
| 4,380,344 | 4/1983 | Abbott . |
| 4,381,069 | 4/1983 | Kreck . |
| 4,394,947 | 7/1983 | Tartaglia . |
| 4,411,461 | 10/1983 | Rosenberg . |
| 4,413,761 | 11/1983 | Angel . |
| 4,437,599 | 3/1984 | Jordening . |
| 4,461,410 | 7/1984 | Tartaglia . |
| 4,461,413 | 7/1984 | Hoerner ..................... 224/42.44 |
| 4,483,468 | 11/1984 | Lucas ......................... 224/42.08 |
| 4,676,413 | 6/1987 | Began . |
| 4,676,414 | 6/1987 | Deguevara . |
| 4,863,080 | 9/1989 | Graber . |

OTHER PUBLICATIONS

Reese Bike Hitch Advertisement.

*Primary Examiner*—Linda J. Sholl
*Attorney, Agent, or Firm*—Leon E. Redman; Malcolm L. Sutherland

[57] ABSTRACT

A bicycle rack adapted to be detachably mounted to a passenger vehicle via a standard trailer hitch with the bicycle rack having a vertical support pivotally connected at one end to a base assembly with an upper crossbar assembly pivotally connected to the other end via a removable and reversible crossbar bracket on which a clamp arm is removably mounted. A pull pin releasably locks the vertical tube in an upright position to the base assembly and another pull pin locks the upper crossbar assembly in a horizontal position to the vertical support. Spacers may be removably inserted in downwardly depending flanges of the base assembly to mount it to a relatively narrow trailer hitch.

15 Claims, 4 Drawing Sheets

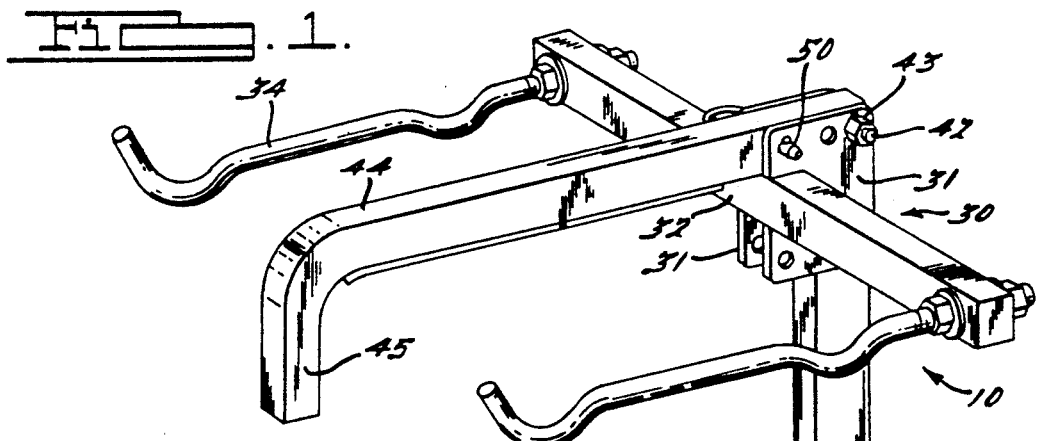
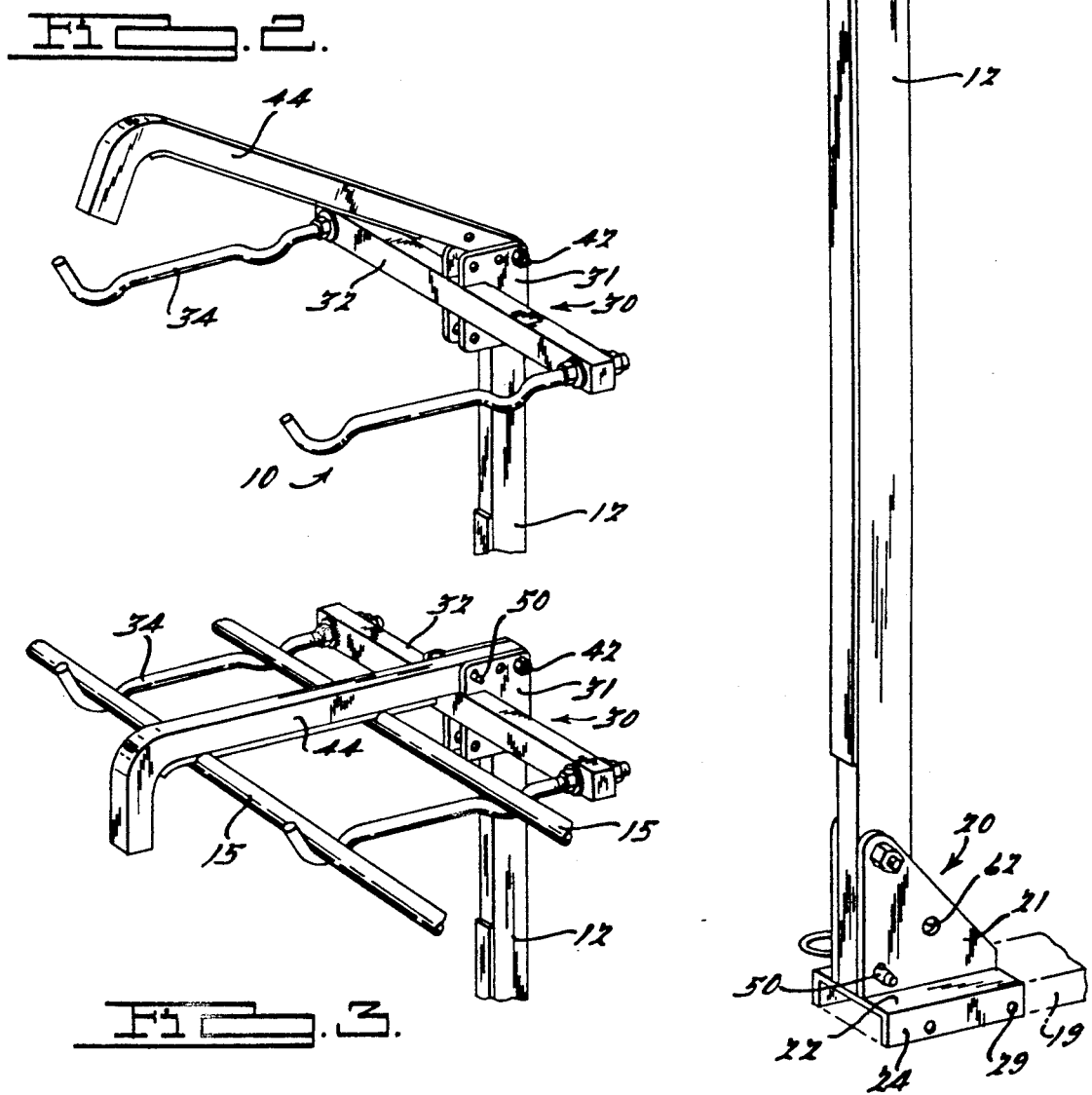

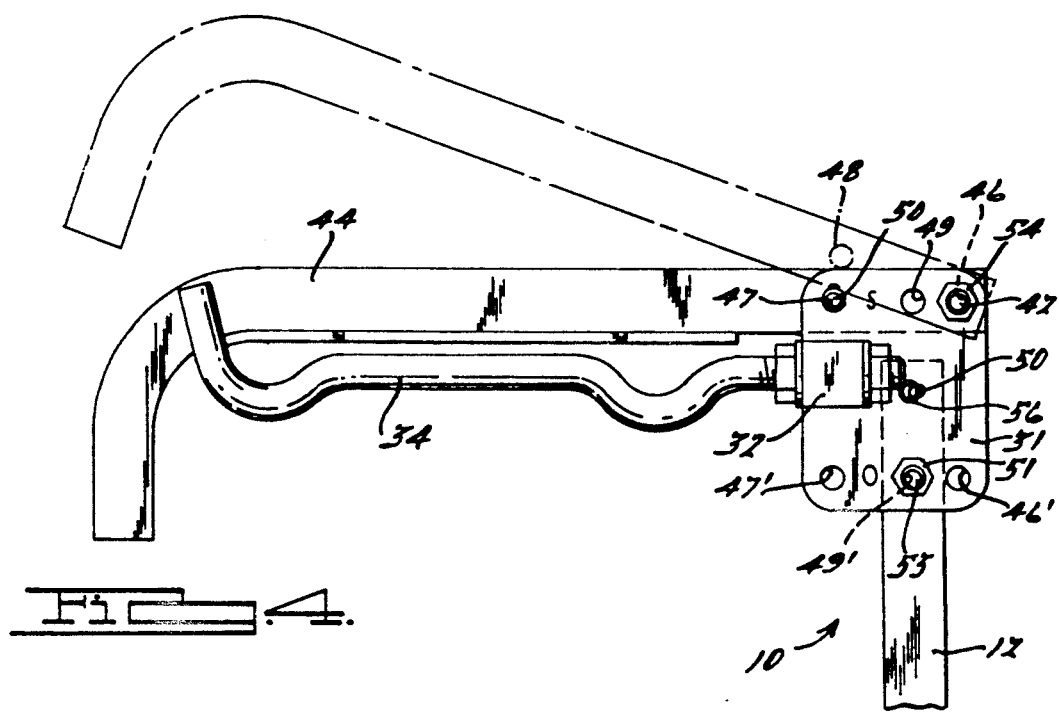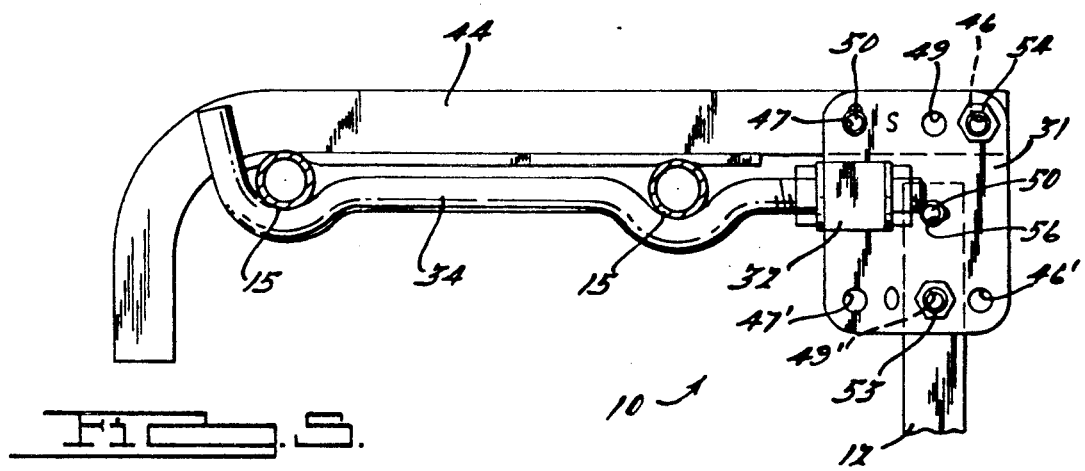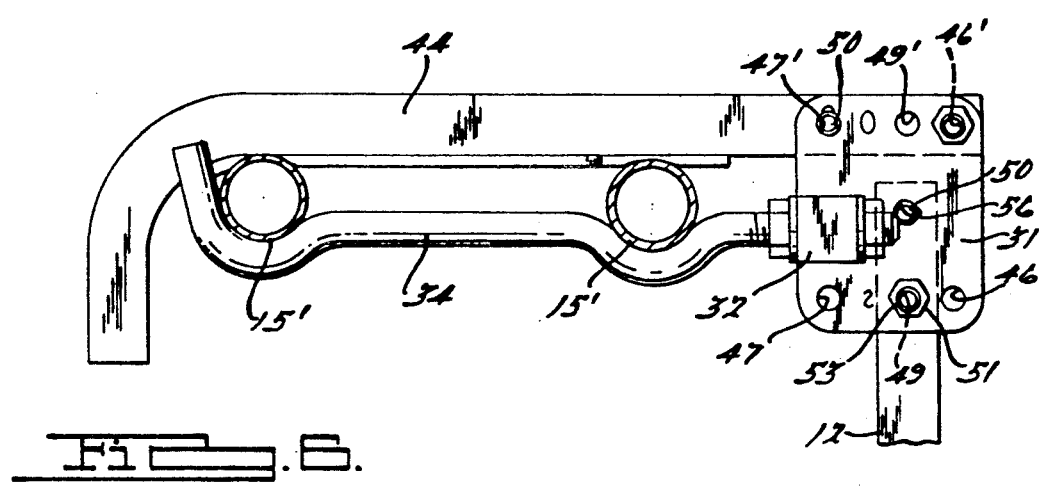

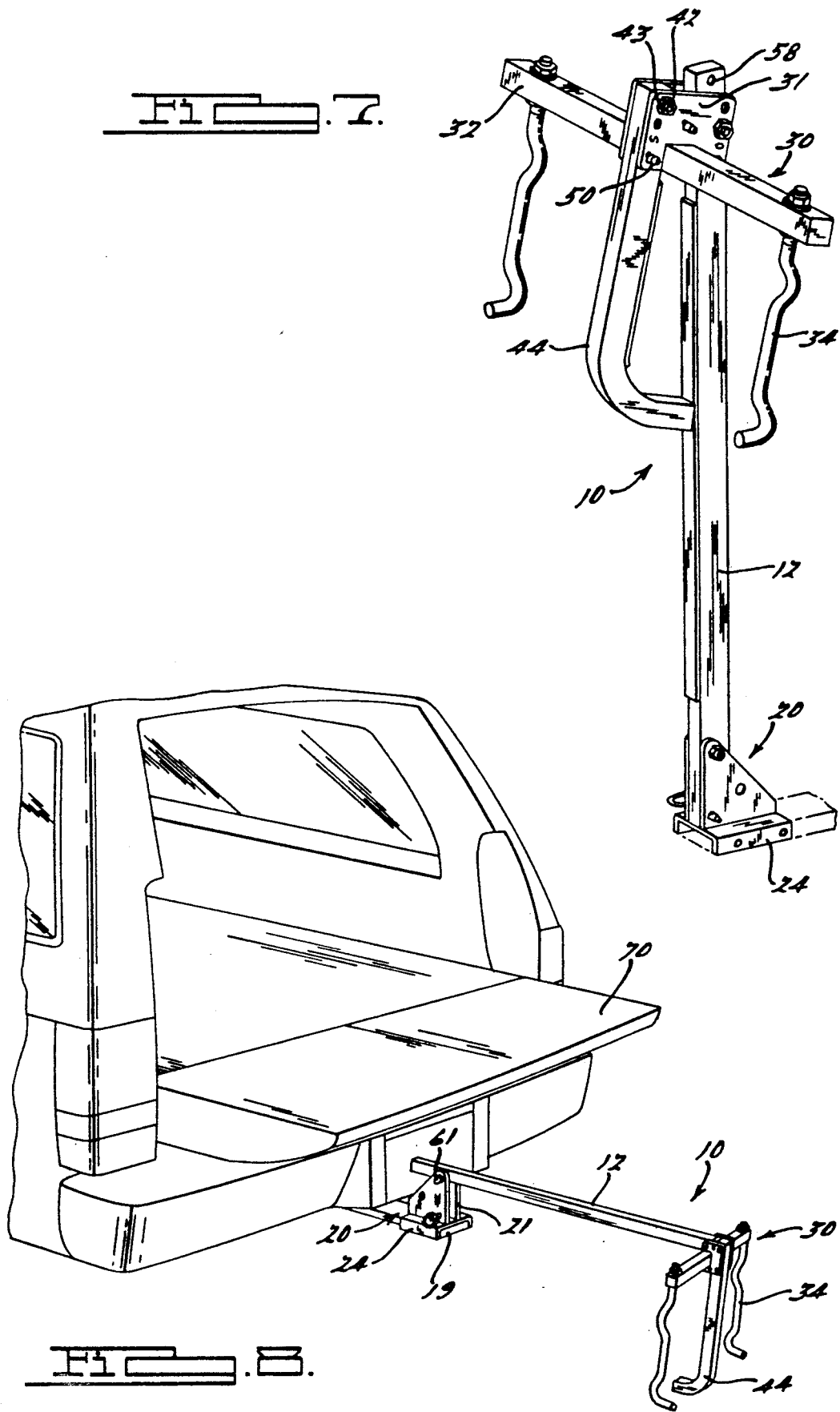

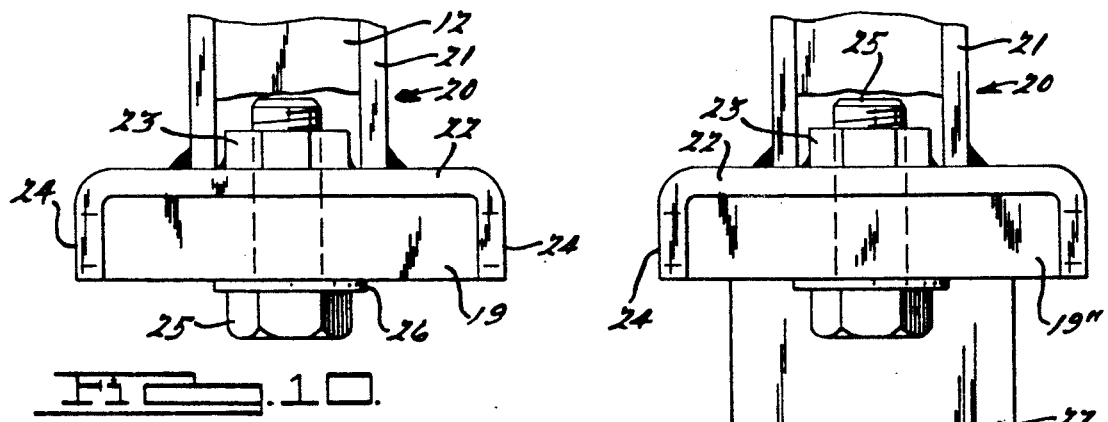
FIG. 10.
FIG. 11.
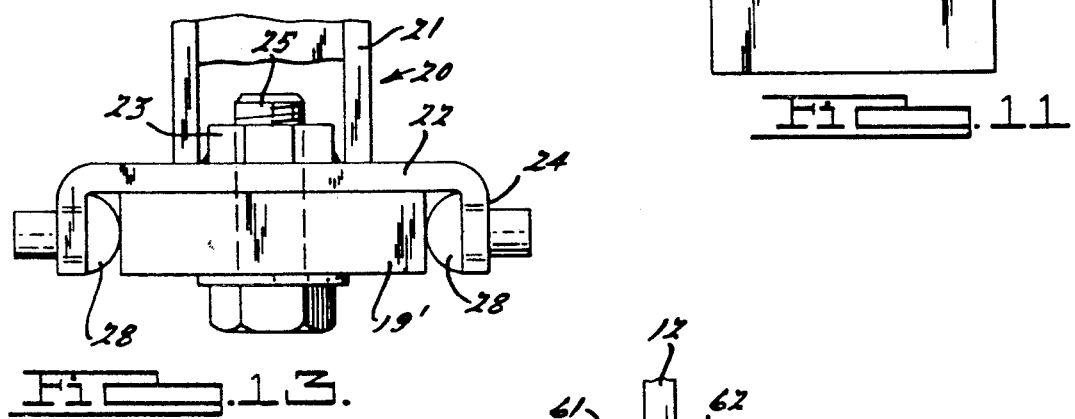
FIG. 13.
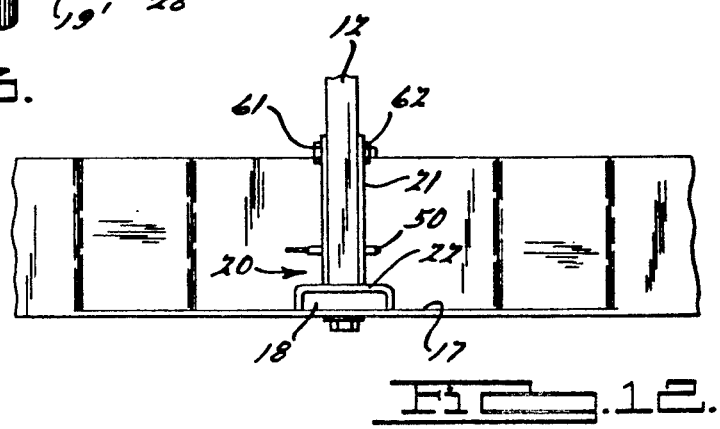
FIG. 12.
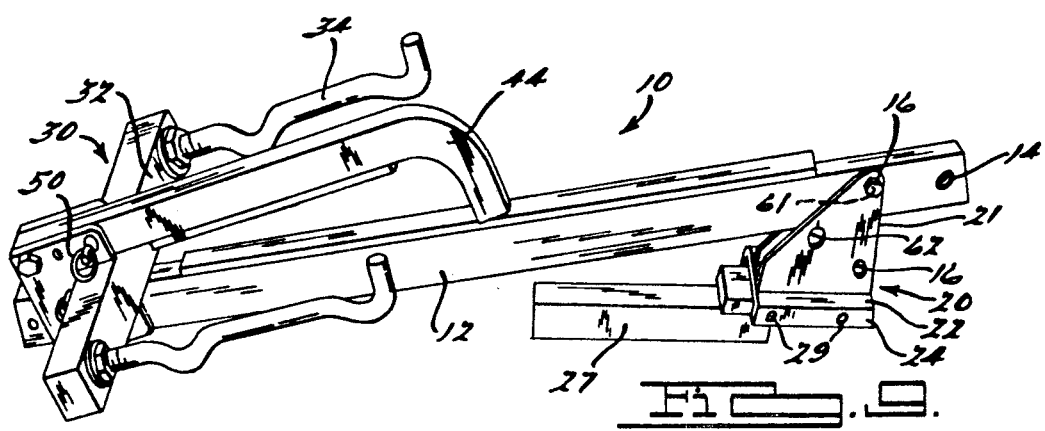
FIG. 9.

HITCH MOUNTED BICYCLE RACK

FIELD OF THE INVENTION

The present invention relates generally to a bicycle rack detachably mounted by a base assembly to a vehicle such as a passenger vehicle via a standard trailer hitch such as a square tube hitch receiver via utility hitch bar, or a standard trailer hitch tongue. More particularly, the invention relates to a bicycle rack with a clamp arm that is movable between an open position for loading and unloading bicycles to an from the rack and a clamping position to secure the loaded bicycles to the rack. A reversible top assembly enables the clamp arm to accommodate bicycles having standard racing frames as well as mountain bikes and other bikes with larger diameter frames. The reversible top assembly can be folded downward for compact storage of the bike rack. The base assembly enables the bike rack to be folded backward from the vehicle to provide clearance for a rear door or hatch of the vehicle and is also adapted to accommodate different width tongues of various trailer hitches and utility hitch bars.

BACKGROUND OF THE INVENTION

Bicycle racks for attachment to passenger vehicle bumpers are well known. Bicycle racks which may be detachably secured to a conventional trailer hitch mounted on a passenger vehicle have recently been invented. Such bicycle racks typically employ a rectangular base tube that is received in the trailer hitch square tube hitch receiver mounted on a passenger vehicle. A T-shaped bar is secured to and extends upwardly from the base tube. A pair of hook rods are mounted on the top of the T-bar to carry the crossbar of one or more bicycles. Various clamping devices have been used in the prior art to attempt to secure the crossbar of the bicycles to the hook rods extending outwardly from the T-bar. Such clamping devices have various drawbacks. Some lack the necessary structural integrity to securely hold bicycles onto the carrier while being transported by the vehicle. Others are costly to manufacture. Other clamping devices are cumbersome to use. Others lack durability.

One such prior art bicycle rack is disclosed in U.S. Pat. No. 4,676,414. It employs an L-shaped clamping member that has a vertical portion telescopically received within a tubular slide member secured to the back of the T-bar. This type of clamping device is costly to manufacture. It is also cumbersome to use in that it requires the L-shaped clamp member to be lifted vertically and held in a vertical position while bicycles are loaded or unloaded from the hook rods. With this arrangement, interference between the slidable portion of the L-shaped clamp member and the tubular member at the back of the T-bar exacerbates the cumbersome nature of this arrangement.

Another recently introduced prior art bicycle rack is the bike hitch shown and described in U.S. Ser. No. 384,578 filed Jul. 28, 1989. This bike hitch employs a clamp arm pivotally secured to a U-shaped bracket which is fixedly and permanently mounted to the top of the vertical tube and can accommodate only the standard size frame of racing bicycles. The lower portion of the vertical tube is likewise fixedly secured to a horizontally disposed base tube that supports the bicycle rack in a conventional hitch receiver. Neither the top assembly of this rack nor the base assembly permits the bicycle rack to be folded for compact storage or rotated backward to provide clearance for the rear door or hatch of a passenger vehicle or truck.

It is an object of this invention to provide a bicycle rack which securely and conveniently clamps the crossbars of different size frame bicycles.

It is another object of the invention to provide such a rack which may be rotated rearward from the vehicle to permit ready access and clearance for a rear door or hatch of the passenger vehicle.

It is yet another object of the invention to provide such a bicycle rack which may be folded for compact storage.

It is yet another object of the invention to provide such a bicycle rack which may be mounted to a conventional trailer hitch tongue, a square tube receiver via a standard utility hitch bar, or a step bumper of a passenger vehicle or truck.

Another object of the invention is to provide such a rack which is convenient to use, yet sturdy and durable and cost efficient to manufacture.

SUMMARY OF THE INVENTION

These and various other objects of the invention are accomplished by a hitch mountable bicycle rack which employs a clamp arm pivotally secured between two spaced apart upper brackets each provided with both upper and lower pairs of aligned and spaced apart apertures, with corresponding apertures provided in the clamp arm. A bolt extends through one of the pairs of either the upper or lower apertures in the upper brackets and through one of the apertures in one end of the clamp arm to pivotally connect the removable clamp arm to the upper brackets which also support a crossbar assembly from which bicycle support hooks extend outwardly. A locking device, such as a locking pin, may be inserted through aligned apertures in the clamp arm and brackets, which apertures are spaced away from the pivot connection and secure the clamp arm in a lower clamped position to secure the crossbars of bicycles mounted on the support hooks of the crossbar assembly. A pair of vertically spaced apart apertures are provided at the top end of the vertical tube with corresponding apertures provided in the upper brackets to enable the upper brackets to be reversibly mounted at the top of the vertical tube. The crossbar assembly is fixedly secured to the brackets at a position vertically offset from its center. The two pairs of clamp mounting apertures are provided at opposite locations of the reversible upper brackets so that the clamp arm is spaced a predetermined distance above the bicycle support hooks to accommodate a standard size bicycle frame and with the upper bracket mounted in a reversed position, and the clamp arm pivotally mounted to the other of the two pairs of clamp mounting apertures, the bicycle support hooks are spaced from the clamp arm a greater distance to accommodate larger diameter bicycle frames. The vertical tube is pivotally supported in its vertical position by a lower base assembly having a pair of spaced apart uprights each provided with a pair of vertically spaced apart apertures corresponding to apertures provided at the lower end of the vertical tube. A removable locking pin secures the vertical tube in its upright position. The base plate of the base assembly is provided with a pair of spaced apart downwardly directed flanges for mounting onto a standard trailer tongue. Spacer members may be provided between the inside of one or both downwardly directed flanges to accommodate a relatively narrower trailer hitch tongue.

BRIEF DESCRIPTION OF THE DRAWINGS

FIG. 1 is a perspective view of the bicycle rack of the present invention mounted to a trailer hitch tongue and rotated to and releasably locked in its vertically upright position and with its upper bracket assembly rotated to and releasably locked in its outwardly extending horizontal position for carrying bicycles for transportation;

FIG. 2 is a fragmentary perspective view showing the clamp arm pivoted to the upper bicycle loading and unloading position;

FIG. 3 is a fragmentary, perspective view showing the clamp arm pivoted to the lower closed position securing the bicycle crossbars for transportation;

FIG. 4 is a fragmentary, side elevational view showing the clamp arm in the lower bicycle securing position and in phantom lines in the upper position;

FIG. 5 is a fragmentary, side elevational view showing the clamp arm in the lower bicycle securing position and removably mounted in apertures at one location of the bracket and with the crossbar assembly bracket oriented relative to the vertical tube for accommodating standard size frame bicycles;

FIG. 6 is a fragmentary, side elevational view showing the clamp arm in the lower bicycle securing position with the clamp arm removably mounted in bracket apertures opposite those of FIG. 5 and with the crossbar assembly bracket mounted in a position reverse to that shown in FIG. 5 for accommodating relatively larger diameter bicycle frames;

FIG. 7 is a perspective view of the bicycle rack of the present invention mounted to a trailer tongue with the clamp arm in the closed position and the crossbar assembly rotated downward;

FIG. 8 is a fragmentary perspective view showing the bicycle rack of the present invention mounted to a trailer hitch tongue of a passenger vehicle with the vertical tube rotated rearwardly to a generally horizontal position to provide clearance for an open rear door or tailgate of the vehicle;

FIG. 9 is a perspective view of the bicycle rack of the present invention folded for compact storage with a standard utility hitch bar attached to the base assembly;

FIG. 10 is a fragmentary, rear elevational view showing the base plate of the base assembly secured to a standard width trailer hitch tongue through the hole in the trailer hitch tongue otherwise used to attach a trailer hitch ball;

FIG. 11 is a fragmentary, rear elevational view of the bicycle rack of FIG. 9 similarly mounted on a standard utility hitch bar;

FIG. 12 is a fragmentary, rear elevational view showing the bicycle rack of the present invention mounted on the step bumper of a vehicle and employing a spacer plate between the top surface of the step bumper and the underside of the lower base plate; and FIG. 13 is a fragmentary, rear elevational view of the bicycle rack of the present invention mounted onto a relatively narrower trailer hitch tongue with rivet heads as spacers.

DESCRIPTION OF THE PREFERRED EMBODIMENT

Referring to FIGS. 1 through 13, the bicycle rack 10 comprises a vertically extending support member or tube 12, a generally horizontally disposed crossbar assembly 30, and a base assembly 20. The crossbar assembly 30 includes a pair of parallel spaced apart upper brackets 31 which each have a generally rectangular configuration with its height slightly greater than its width. A crossbar 32 which is generally tubular and of a square cross-sectional configuration is welded in notches provided at the rearward vertical edge of brackets 31 at a location vertically offset from the vertical center of the brackets 31. As will be explained later, this enables the bicycle rack 10 to accommodate relatively larger diameter framed brakes merely by reversing the orientation of the upper or crossbar assembly 30 from that shown in FIGS. 1-5 to the orientation shown in FIG. 6. A pair of hook rods or hooks 34 extend outwardly from the outer ends of the crossbar 32 for supporting either one or two bicycles (not shown). The hook rods 34 each have a threaded end which is inserted through apertures at the outer ends of the crossbar 32 and are held in place via nuts 33. The pivotable and reversible attachment of the upper or crossbar assembly 30 to the vertical tube 12 will now be described in more detail with particular reference to FIGS. 1 and 4-9.

A clamp arm 44 is pivotally and removably connected to brackets 31 and disposed centrally between, above and generally parallel to the hook rods 34 via bracket pivot apertures 46 provided in upper brackets 31 to support a pivot member or bolt 42 which extends through clamp arm 44 and is secured via nut 43. Alternatively, with the brackets through apertures 46'. A locking device such as locking pull pin 50 (FIGS. 1, 3-7 and 9) extends through both the upper brackets 31 and the clamp arm 44 to secure the clamp arm 44 against bicycle crossbars 15 or 15' (FIGS. 3, 5 and 6) for transportation. The pull pin 50 is removably inserted through bracket locking apertures 47 (or 47' if the bracket is in reversed orientation) which are horizontally aligned with and spaced apart from apertures 46 and 46', respectively. Clamp arm 44 has a downwardly extending portion 45 at its distal end. Apertures 49 and 49' are provided in each of the upper brackets 31 and are horizontally aligned with apertures 46, 47 and 46', 47', respectively. Bolt 53 pivotally and removably secures the upper assembly 30 to the vertical tube 12 via aligned aperture 49 or 49' (depending on the orientation of the bracket 31 relative to the vertical tube 12) and the corresponding aperture 51 near the top of vertical tube 12.

A locking device such as pull pin 50 releasably is inserted through aligned apertures 56 in the brackets 31 and apertures 58 at the top of vertical support 12.

The apertures 46 and 47 on each of the upper brackets 31 are horizontally aligned and spaced apart from each other. The clamp arm 44 is similarly provided with a pair of spaced apart apertures 48, 54 which correspond to the bracket apertures 47 and 46, respectively, as well as apertures 47' and 46'. The clamp arm is pivotally connected aligned apertures 46 of the bracket and 54 of the clamp arm or through apertures 46' of the bracket and 54 of the clamp arm if the brackets 31 are in reversed orientation. A washer is disposed between the head of the bolt 42 and the sidewall of the bracket 31. With the clamp arm 44 in the lower position (FIGS. 1 and 3-9), the apertures 48 of the clamp arm 44 are aligned with the apertures 47 (47' if bracket 31 is in reversed orientation) of the bracket 31 thereby permitting a locking member such as pull pin 50 to lock the clamp arm 44 in the lower position engaged against the top of the crossbars 15 (or 15') of the bicycles. A foam tape strip is adhesively secured to the underside of the clamp arm 44 to protect the crossbar 15 from being scratched. A pull ring is provided on one end of the pull pin 50 to facilitate its removal. A foam tape strip is also provided on the front of the vertical tube 12 to protect the bicycles from being scratched. End cap members may be provided to close the open ends of the clamp arm 44 and the crossbar 32.

An "S" marking is provided on the brackets 31 adjacent one set of clamp mounting and locking apertures 46, 47 to indicate that the clamp arm 44 is mounted to the brackets 31 and that the brackets 31 are in a position to secure a standard size bicycle crossbar 15 to hooks 34. An "O" marking is provided adjacent the opposite clamp arm mounting and locking apertures 46', 47' to indicate that the clamp arm 44 is mounted to the bracket 31 in a reversed orientation to accommodate oversize bicycle frame crossbars 15'.

In operation, the clamp arm 44 is readily pivoted to the upper position (FIGS. 2 and 4) to facilitate loading and unloading of the bicycles onto the hook rods 34. Once the bicycles are loaded, the clamp arm 44 is readily lowered to clamp the crossbars 15 (or 15') of the bicycles against the hook rods 34 and a locking device such as pull pin 50 is inserted through the aligned apertures 48, 47 (or 47') of the clamp arm and bracket, respectively, to firmly lock the clamp arm 44 in the lower position thereby securing the bicycles for transportation.

The bicycle rack 10 is detachably mounted via the base assembly 20 to a conventional trailer hitch tongue 19 which may be permanently affixed to the frame of a passenger vehicle. Base assembly 20 includes a pair of base plate uprights 21 each welded at its lower edge to the top surface of base plate 22. Base plate uprights 21 are generally triangular in configuration, parallel to each other and spaced apart a distance that corresponds to the width of the generally rectangular cross-sectional vertical tube 12. A base plate nut 23 (see FIGS. 10, 11 and 13) is welded to the upper surface of base plate 22 intermediate the spaced apart base plate uprights 21 at a substantially central location of the base plate 22. Base plate 22 is provided with a pair of downwardly extending flanges 24 which are spaced apart a distance that corresponds to the 2¼" width of a standard trailer hitch tongue 19. The base assembly 20 is secured to tongue 19 via a threaded bolt that extends upwardly through the standard ball hole provided in the trailer hitch tongue and is locked in place by threading through the nut 23 with cone washer 26 interposed between the head of bolt 25 and the bottom of the tongue 19. As best seen in FIG. 11, the base assembly may be likewise secured to the tongue portion 19' of a conventional utility hitch bar 27.

Referring to FIG. 13, spacers 28 may be employed to mount the base assembly 20 onto a relatively narrower 2" width tongue 19'. Spacers 28 may conveniently comprise rivet heads of rivets mounted in spaced apart apertures 29 provided in flanges 24 of base plate 22. Thus rivets or spacers 28 may be readily removed to mount the base assembly onto a standard width tongue.

Referring to FIG. 12, the base assembly is similarly secured to a step bumper by using a spacer plate 18 between the top of the bumper step 17 and the underside of the base plate 22.

Each of the base plate uprights 21 is provided with a pair of vertically aligned and spaced apart apertures 16 with corresponding apertures 14 provided at the lower end of the vertical tube 12. The vertical tube 12 thus is pivotally mounted for rotation between the vertical uprights 21 via lower bolt 61 and nut 62. A locking pull pin 50 extends through a lower aperture 16 in one of the base plate uprights 21 and through lower aperture 14 in the vertical tube 12 and extending out the other base plate upright 21 (see FIGS. 1, 7 and 12). By removing pull pin 50 from the lower apertures 16, 14 the vertical tube 12 may be rotated in a rearward direction away from the vehicle as seen in FIG. 8 to a substantially horizontal position to provide clearance to open a rear door 70 or hatch (not shown) of a vehicle. A hole 62 is provided in each of the base plate uprights 21 to receive a cable or padlock (not shown) for security purposes.

Referring to FIG. 9, the pull pin 50 may be removed from apertures 14 and 16 and the lower base assembly 20 may be pivoted in the other direction relative to the vertical tube 12 to fold it and any attached utility hitch bar 27 into a compact configuration for compact storage. Similarly, the pull pin 50 may be removed from apertures 56 and 58 so that the upper assembly 30 may also be folded into a compact configuration for storage.

Although a preferred embodiment of the hitch mounted bicycle rack of the present invention has been shown and described in detail, it should be noted that variations or modifications may be made without departing from the spirit or scope of the present invention.

What is claimed is:

1. A bicycle rack comprising:
    a lower base member adapted to be removably mounted onto a trailer hitch affixed to a vehicle;
    an upper assembly disposed in generally a horizontal position and having a crossbar member, a pair of spaced apart bicycle support hooks extending outwardly from said crossbar member, a pivotally operated clamp arm for clamping at least one bicycle onto said support hooks, bracket means for mounting said crossbar member, said bracket means provided with vertically spaced apart clamp arm mounting means for removably and pivotally mounting said clamp arm for pivotable operation at either of two vertically spaced apart first and second pivot locations on said bracket means such that said clamp arm is pivotally mounted a first predetermined distance above said support hooks with said clamp arm pivotally mounted at one of said pivot locations and said clamp arm pivotally mounted above said support hooks a distance different from said first predetermined distance with said clamp arm pivotally mounted at the other of said pivot locations;
    a vertical support member having a lower end secured to said lower base member and extending upwardly therefrom; and
    means for mounting said bracket means on the upper end of said vertical support member, said clamp arm pivotally mounted at the first pivot location of said vertically spaced apart pivot locations for clamping bicycle frames having a first predetermined diameter and said clamp arm pivotally mounted at the second pivot location of said vertically spaced apart first locations for clamping bicycle frames having a second predetermined diameter smaller than said first predetermined diameter.

2. A bicycle rack comprising:
    a lower base member adapted to be removably mounted onto a trailer hitch affixed to a vehicle;

an upper assembly disposed in generally a horizontal position and having a crossbar member, a pair of bicycle support hooks extending outwardly from opposite ends of said crossbar member, a clamp arm for clamping at least one bicycle onto said support hooks, reversible bracket means for mounting both said crossbar member and for removably mounting said clamp arm at either of two spaced apart locations on said bracket means such that said clamp arm is disposed a first predetermined distance above said crossbar member and said support hooks with said clamp arm mounted at one of said locations and said clamp arm is disposed above said crossbar member and said support hooks a distance different from said first predetermined distance with said clamp arm mounted at the other of said locations;

a vertical support member having a lower end secured to said lower base member and extending upwardly therefrom; and means for reversibly mounting said reversible bracket means on the upper end of said vertical support member, said reversible bracket means provided with a pair of vertically spaced apart aperture means for removably mounting said clamp arm at either of said pair of aperture means and said crossbar member mounted on said reversible bracket means at a location vertically closer to one of said pair of aperture means than the other of said pair of aperture means whereby said bicycle rack can clampingly support bicycles of different diameter frames.

3. The bicycle rack of claim 2 further comprising means for pivotally securing said upper assembly to said vertical support member and thereby enabling said upper assembly to be pivoted downwardly from said generally horizontal position.

4. The bicycle rack of claim 3 further comprising means for releasably locking said upper assembly in said generally horizontal position.

5. The bicycle rack of claim 4 wherein said releasable locking means includes bracket locking aperture means provided in said bracket means at a location vertically spaced equidistant between said pair of vertically spaced apart aperture means.

6. A bicycle rack comprising:

a generally horizontally disposed and reversible upper assembly including a reversibly mountable bracket, a horizontally disposed crossbar affixed to said bracket, a pair of bicycle support hooks extending outwardly from opposite ends of said crossbar in a generally horizontal plane, a clamp arm disposed between and above said support hooks for clamping at least one bicycle onto said support hooks, means for removably mounting said clamp arm at either of two vertically spaced apart locations on said bracket such that said clamp arm is disposed a first predetermined distance above said crossbar and said support hooks with said clamp arm mounted at one of said locations and disposed a different predetermined distance above said crossbar and support hooks with said clamp arm mounted at the other of said locations;

a lower base member adapted to be removably mounted onto a trailer hitch affixed to a vehicle;

a vertical support extending upwardly from said lower base member to said upper assembly;

means for pivotally securing said vertical support to said lower base member for enabling said vertical support to be pivoted from a vertical position toward a generally horizontal position with said lower base member mounted on said trailer hitch;

means for pivotally securing said reversible upper assembly to said vertical support for enabling said upper assembly and said horizontally disposed crossbar to be pivoted downwardly from said horizontal position thereby pivotally lowering said support hooks from said horizontal plane;

means for releasably locking said upper assembly in said generally horizontally disposed position; and said means for removably mounting said clamp arm including a pair of vertically space apart aperture means for removably mounting said clamp arm at either of said pair of aperture means and said crossbar fixedly mounted to said bracket at a location vertically closer to one of said pair of aperture means than the other of said pair of aperture means.

7. The bicycle rack of claim 6 wherein said releasable locking means includes bracket locking aperture means provided in said bracket at a location vertically equidistant to both of said pair of vertically spaced apart aperture means.

8. The bicycle rack of claim 6 further comprising removable spacer means disposed between said lower base member and said trailer hitch for securely mounting said lower base assembly to different width trailer hitches.

9. A bicycle rack comprising:

a lower base member adapted to be removably mounted onto a trailer hitch affixed to a vehicle;

an upper assembly disposed in generally a horizontal position and having a crossbar member, a pair of spaced apart bicycle support hooks extending outwardly from said crossbar member, a clamp arm for clamping at least one bicycle onto said support hooks, reversible bracket means for mounting both said crossbar member and for removably mounting said clamp arm at either of two spaced apart locations on said bracket means such that said clamp arm is disposed a first predetermined distance above said support hooks with said clamp arm mounted at one of said locations and said clamp arm is disposed above said support hooks a predetermined distance different from said first predetermined distance with said clamp arm mounted at the other of said locations;

a vertical support member having a lower end secured to said lower base member and extending upwardly therefrom; and means for reversibly mounting said reversible bracket means on the upper end of said vertical support member, said reversible bracket means provided with a pair of vertically spaced apart mounting means for removably mounting said clamp arm at either of said pair of mounting means and said crossbar member mounted on said reversible bracket means at a location vertically closer to one of said pair of mounting means than the other of said pair of mounting means, whereby said bicycle rack can clampingly support bicycles of different diameter frames.

10. The bicycle rack of claim 9 further comprising means for pivotally securing said upper assembly to said vertical support member and thereby enabling said upper assembly to be pivoted downwardly from said generally horizontal position.

11. The bicycle rack of claim 10 further comprising means for releasably locking said upper assembly in said generally horizontal position.

12. The bicycle rack of claim 11 wherein said releasable locking means includes bracket locking means at a location vertically spaced equidistant between said pair of vertically spaced apart mounting means.

13. A bicycle rack comprising:
a generally horizontally disposed and reversible upper assembly including a reversibly mountable bracket, a horizontally disposed crossbar affixed to said bracket, a pair of bicycle support hooks extending outwardly from said crossbar in a generally horizontal plane, a clamp arm disposed between and above said support hooks for clamping at least one bicycle onto said support hooks, means for removably mounting said clamp arm at either of two vertically spaced apart locations on said bracket such that said clamp arm is disposed a first predetermined distance above said crossbar and said support hooks with said clamp arm mounted at one of said locations and disposed a different distance above said crossbar and support hooks with said clamp arm mounted at the other of said locations;
a lower base member adapted to be removably mounted onto a trailer hitch affixed to a vehicle;
a vertical support extending upwardly from said lower base member to said upper assembly;
means for pivotally securing said vertical support to said lower base member for enabling said vertical support to be pivoted from a vertical position toward a generally horizontal position with said lower base member mounted on said trailer hitch;
means for pivotally securing said reversible upper assembly to said vertical support for enabling said upper assembly and said horizontally disposed crossbar to be pivoted downwardly from said horizontal position thereby pivotally moving said support hooks from said horizontal plane;
means for releasably locking said upper assembly in said generally horizontally disposed position; and
said means for removably mounting said clamp arm including a pair of vertically spaced apart mounting means for removably mounting said clamp arm at either of said pair of mounting means and said crossbar fixedly mounted to said bracket at a location vertically closer to one of said pair of mounting means than the other of said pair of mounting means.

14. The bicycle rack of claim 13 wherein said releasable locking means includes bracket locking aperture means provided in said bracket at a location vertically equidistant to both of said pair of vertically spaced apart mounting means.

15. The bicycle rack of claim 13 further comprising removable spacer means disposed between said lower base member and said trailer hitch for securely mounting said lower base assembly to different width trailer hitches.

* * * * *